United States Patent Office 2,763,250
Patented Sept. 18, 1956

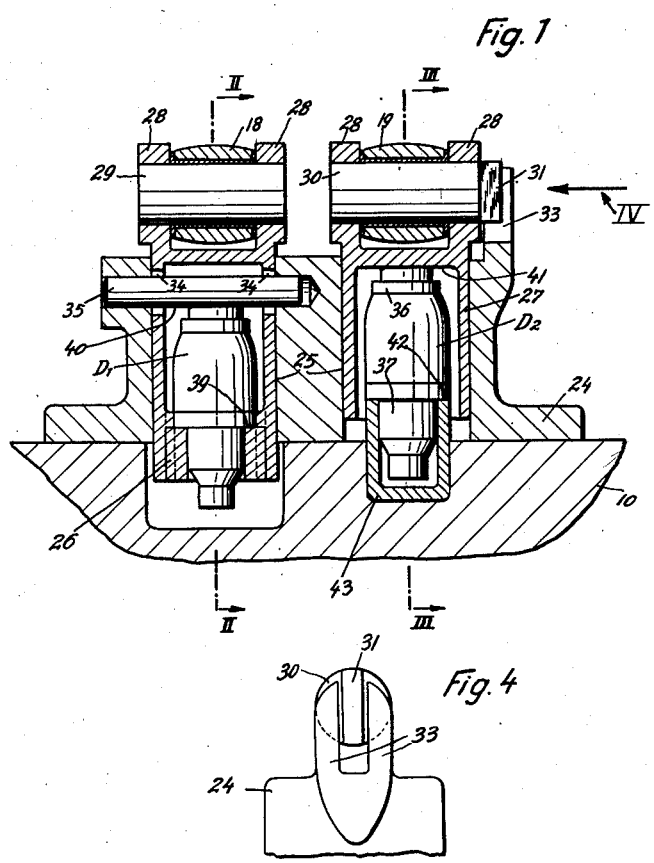

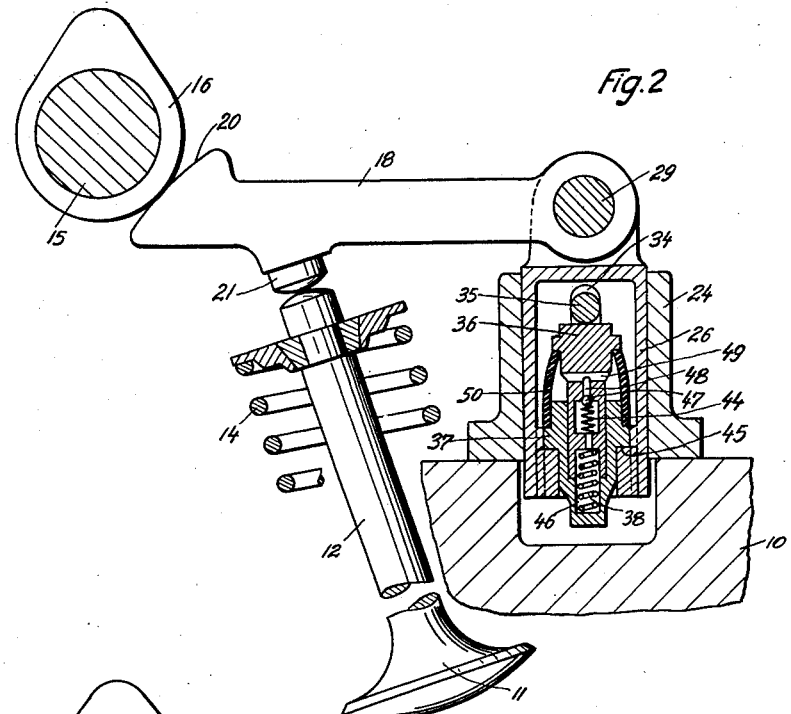
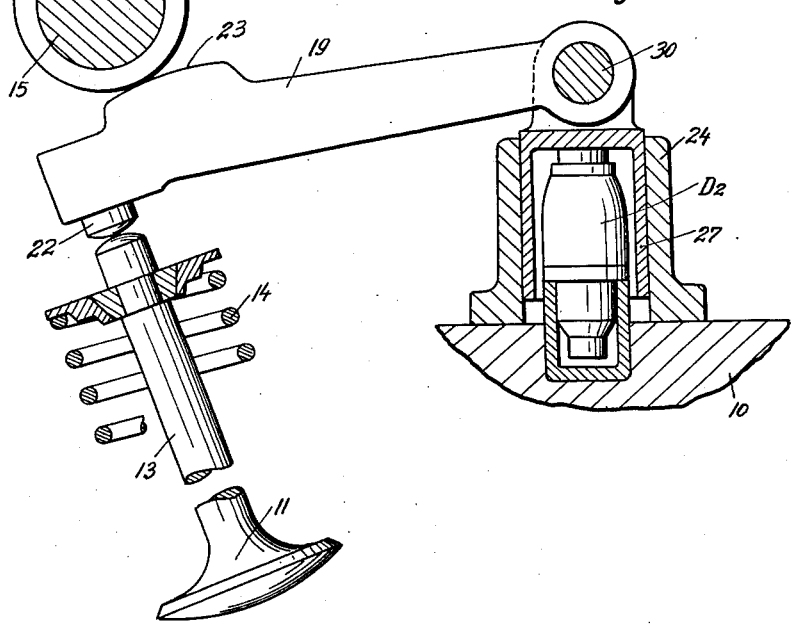

2,763,250

VALVE ACTUATING MECHANISM FOR INTERNAL COMBUSTION ENGINES

Wolf-Dieter Bensinger, Stuttgart-Unterturkheim, and Adolf F. Ch. Wente, Stuttgart-Bad Cannstatt, Germany, assignors to Daimler-Benz Aktiengesellschaft, Stuttgart-Unterturkheim, Germany Application August 27, 1953, Serial No. 376,858

Claims priority, application Germany August 29, 1952

6 Claims. (Cl. 123—90)

Our invention relates to a valve actuating mechanism for internal combustion engines in which the linkage actuated by a cam and actuating the valve includes a lever pivotally mounted either between its ends or at one of its ends.

It is an object of the present invention to provide a valve actuating mechanism of this type with improved means for automatically eliminating lost motion between the cam and the valve.

It is another object of the present invention to provide a valve actuating mechanism with automatic hydraulic means which will automatically eliminate any lost motion in the linkage without increasing the moving masses of the linkage and without requiring much space.

In prior valve actuating mechanisms, the linkage included a push rod carrying a hydraulic device adapted to automatically take up lost motion, such device comprising substantially a pair of telescopic elements tending to move apart to thereby take up any clearance. In this prior mechanism, however, the hydraulic device partakes in the reciprocatory motion of the valve actuation and, therefore increases the moving masses which is highly undesirable. Moreover, such prior hydraulic device had a considerable width rendering the installation thereof difficult.

Viewed from one aspect, the present invention resides in the provision of means for automatically adjusting the pivot of a lever included in the valve actuating linkage, whereby any clearance will be taken up and the lost motion will be permanently eliminated.

It is another object of the invention to so design the actuating linkage that the automatic adjusting device will be subjected to comparatively small forces only.

In a preferred embodiment of the present invention, the device for mounting the pivot on the cylinder head for automatic adjustment comprises a pair of telescopic elements and is thus capable of expansion and contraction. A spring or other suitable means tend to cause extension or expansion of the device. However, a one-way lock, preferably formed by a liquid and a check valve, prevents contraction of the device. In this manner, the device will eliminate any lost motion in the linkage.

Where the device used for mounting the pivot of a two-armed lever forming part of the linkage is composed of cylindrical elements, a safeguard must be provided to prevent the lever from accidentally turning about the axis of the cylindrical elements, and it is another object of the present invention to provide suitable means for achieving that purpose.

Some preferred embodiments of our invention are shown in the accompanying drawings by way of example and will be described hereinafter in detail. However, we wish it to be clearly understood that such detailed description serves the purpose of illustration rather than that of limitation.

In the drawings.

Fig. 1 is a partial vertical section taken through the cylinder head of an interal combustion engine provided with two valves controlled by a cam shaft and by linkages including a pair of one-armed levers, the associated telescopic devices being shown in elevation, Fig. 2 is a section taken along line II—II of Fig. 1, Fig. 3 is a section taken along line III—III of Fig. 1, and Fig. 4 is a partial side view of the mechanism shown in Fig. 1 being viewed in the direction of arrow IV.

The cylinder head 10 of the internal combustion engine is provided with a pair of valves 11 each having an upwardly projecting valve stem 12 and 13 respectively, suitably guided for reciprocatory motion by means not shown. Valve springs, such as 14, tend to keep the valves 11 closed. Thereabove a horizontal cam shaft 15 extending lengthwise of the cylinder block is suitably mounted in bearings, not shown, rigidly attached to the cylinder head 10 and is provided with cams 16 and 17 individually co-ordinated to the valve stems 12 and 13. It will be noted that the two valve stems have different distances from the cam shaft 15, the stem 12 being disposed further to the right than stem 13.

There is provided a pair of one-armed levers 18 and 19 each associated with one of the stems 12 and 13 and the associated one of the cams 16 and 17. Suitable mounting means which will be described in detail hereinafter are provided for pivotally mounting the right hand ends of levers 18 and 19, as viewed in Figs. 2 and 3, on the cylinder head 10. Lever 18 has its free end in engagement with the associated cam 16 and has a point intermediate its end in engagement with the associated stem 12. More particularly, the free end of lever 18 is formed with a curved follower face 20 tangentially contacting cam 16 for actuation by the dwell thereof and being held in permanent contact therewith by the self-adjusting mounting means above referred to. Between its ends lever 18 carries a knob 21 suitably fixed thereto which contacts the end of stem 12 being likewise held in permanent engagement therewith by the mounting means to be described hereinafter.

The second lever 19 has its free end provided with a knob 22 in engagement with the associated stem 13, whereas a point intermediate the ends of lever 19 engages the associated cam 17, such point being formed by a curved follower face 23.

The means for mounting the right hand ends of levers 18 and 19 on the cylinder head 10 will now be described. On the cylinder head there is fixed a bracket 24 having a pair of vertical bores 25 equally spaced from cam shaft 15 and constituting guideways in which cylindrical slides 26 and 27 are movable. The slides project above the top of bracket 24 each being provided with a pair of spaced coaxial eyes 28 in which a pin 29, or 30 respectively, is suitably fixed. The lever 18 is pivotally mounted on pin 29 and the lever 19 is pivotally mounted on pin 30.

A safeguard must be provided to prevent the levers 18 and 19 from accidentally turning about the vertical axes of bores 25 in bracket 24. For that purpose, one end face of the pivot 30 is provided with a projecting diametrical lip 31 engaging the space between a pair of parallel fingers 33 projecting upwardly from bracket 24. Both of the cylindrical slides 26 and 27 are hollow, the slide 26 being provided with opposed vertical slots 34, a pin 35 extending through such slots being inserted in a horizontal bore of bracket 24. Thus, each of two slides 26 and 27 is guided for a non-rotary sliding motion and will in its turn keep its associated lever 18 and 19 respectively, from turning about the vertical axes.

Moreover, the means for mounting pivots 29 and 31 on the cylinder head 10 include automatic adjusting devices D1 and D2, both devices being of identical structure and having identical dimensions, whereby the cost of manufacture is greatly reduced. Each device is composed of a pair of telescopic elements 36 and 37 and is, therefore, capable of extension and contraction. Suitable means, such as a spring 38 (Fig. 2), tends to cause extension of the device. However, a one-way lock is provided which will substantially prevent contraction of the device.

Each of the slides 26 and 27 and the cylinder head 10 or the bracket 24 which may be considered part of the cylinder head are provided with a pair of opposed supporting faces. Thus, slide 26 has an internal upwardly facing shoulder 39 located beneath pin 35 and spaced therefrom. The shoulder 39 may be formed by a threaded ring screwed into internal threads of slide 26 from below. The shoulder 39 and the bottom face 40 of pin 35 constitute one pair of supporting faces. Device D1 is mounted therebetween and in contact therewith. Thus, the top face of telescopic element 36 engages the bottom face 40, whereas the telescopic element 37 has a shoulder 45 seated on shoulder 39. It will be noted that the supporting face 39 on slide 26 coordinated with the first lever 18 is located beneath the associated supporting face 40 on the cylinder head. Therefore, extension of device D1 between this pair of supporting faces will lower pin 29 and will, therefore, take up any lost motion between lever 18, cam 16 and valve stem 12.

The supporting face provided on slide 27 is formed by the top face 41 of the interior space thereof, whereas the opposed supporting face provided on the cylinder head is formed by the upper edge 42 of a cup-shaped sleeve 43 inserted in a bore of the cylinder head 10 and forming a seat for the shoulder 45 of the device D2, the top of the latter engaging face 41. Hence, it will appear that the supporting face 41 on slide 27 co-ordinated with the second lever 19 is located above the supporting face 42 on the cylinder head. As a result, extension of the telescopic device D2 co-ordinated with the second lever 19 will raise pin 30 and, therefore, eliminate any lost motion between lever 19, cam 17 and valve stem 13.

The identical devices D1, D2 will now be described in detail with reference to Fig. 2.

The telescopic element 37 is cup-shaped constituting a cylinder, whereas telescopic element 36 constitutes a piston slidably guided in such cylinder and confining an expandable chamber 46 therewith in which the spring 38 is inserted. The spring 38 is biassed and thus tends to move the elements 36 and 37 apart.

As stated hereabove, a one-way lock is co-ordinated with the pair of telescopic elements 36 and 37 and is adapted to substantially prevent contraction of the device D1. In the embodiment shown, such one-way lock is constituted by a check valve in the form of a ball 47 held by a spring 44 against the lower end of a conduit 48 which leads to a cross bore 49 of the element 36. The spring 44 is supported on an internal shoulder of chamber 46.

The mouths of cross bore 49 located on the outside of member 36 are connected with a suitable source of liquid and a liquid filling the chamber 46 is provided. Therefore, whenever the device D1 is expanded by spring 38, liquid is sucked into the chamber 46 from the mouths of cross bore 49 past check valve 47 but subsequent contraction of the device D1 is prevented by the liquid in the expandable chamber as this liquid cannot escape because of the provision of the check valve.

In the embodiment shown, the source of liquid is provided by a liquid inside of a jacket 50 of an elastic pliable material, such as rubber, which surrounds the elements 36 and 37 and has its edges suitably attached and sealed thereto by suitable means.

When valve stem 12 is depressed by cam 16 to open the valve 11, the valve spring 14 exerts a considerable force upon knob 21 thus tending to raise slide 26. Owing to the leverage, however, the upward pull exerted upon slide 26 will be small compared with the force of spring 14 and can be easily sustained by the liquid filling the chamber 46 for the limited duration of the depression of stem 12. Closing of the valve will relieve the liquid filling the chamber 46 immediately of pressure. Should it happen, however, owing to heat expansion of stem 12 or for other reasons that the valve 11 will not be fully seated, spring 14 would continue to act on lever 18 and to exert pressure on the liquid filling chamber 46. Under continued pressure, however, the liquid would gradually seep out of chamber 46 past member 36 into the annular space surrounded by jacket 50 until the position to which lever 18 is brought during the valve closing intervals permits a firm seating of valve 11. The seepage, however, is so slow that it does not materially affect the length of the valve opening stroke and does not result in any appreciable lost motion between lever 18, cam 16 and stem 12.

Similar consideration apply to the expanding effect of the self-adjusting device D2 tending to raise slide 27.

While we have described our invention with reference to two specific embodiments thereof, we wish it to be clearly understood that our invention is in no way limited to the details of such embodiments but is capable of numerous modifications within the scope of the appended claims.

What we claim is:

1. In a valve actuating mechanism for internal combustion engines, a valve-lash adjusting mechanism comprising a stationary telescopic element and a telescopic element movable relative to said stationary telescopic element, said telescopic elements overlapping each other only partially and forming therebetween a pressure chamber adjustable in the direction of the height thereof and being at all times delimited by the walls of said telescopic elements, said pressure chamber being adapted to receive a liquid, a source of liquid, conduit means for supplying liquid from said source to said chamber, spring means abutting, on the one hand, against said stationary telescopic element and, on the other, against said movable telescopic element to produce the suction stroke of said movable telescopic element, check valve means to prevent the return flow of said liquid from said chamber to said source through said conduit means, a return by-pass for said liquid from said chamber to said source formed by the play between said telescopic elements, a substantially bell-shaped elastic jacket, means for sealing the ends of said jacket to said stationary telescopic element and said movable telescopic element to provide an airtight space which is delimited by said jacket, said stationary telescopic element and said movable telescopic element and which constitutes the space for said source, the surface of said jacket proceeding from the end thereof surrounding said stationary telescopic element to the other end surrounding said movable telescopic element essentially always in the direction of the latter, an adjustable cylindrical slide member connected for movement with said movable telescopic elements and surrounding said elastic jacket and said telescopic elements, a valve including means for urging said valve to the closed position thereof, a camshaft, a lever actuated by said camshaft to operate said valve, and pivot means for pivotally supporting said lever at said slide member.

2. The combination according to claim 1, further comprising a cylinder head, a pair of valves having upwardly directed valve shafts in said cylinder head, said camshaft being located above said valve shafts and including a cam for each of said shafts, a pair of levers associated with one of said valve shafts and one of said cams and with the other of said valve shafts and the other of said cams respectively, a valve-lash adjusting mechanism for each of said levers including pivot means to provide an axis of rotation for each lever, one of said levers being actuated at the free end thereof by one of said cams and including valve shaft engaging means for one of said valve shafts intermediate the free end and the axis of rotation thereof, the other one of said levers including valve shaft engaging means at the free end thereof and being actuated by said other cam at a point intermediate the free end and the axis of rotation thereof, each of said valve-lash adjusting mechanisms including one of said stationary telescopic elements and one of said movable telescopic elements, one of the elements of one of said adjusting mechanism connected with said one lever being adjustable downwardly and the other telescopic element abutting upwardly against a part rigidly connected with said cylinder head, while the one telescopic element of the other adjusting mechainsm connected with the other lever being adjustable upwardly and the other telescopic element thereof abutting downwardly against said cylinder head.

3. The combination according to claim 2, futher comprising an adjustable cylindrical slide member including the pivot means of said one lever, guide means for said last-mentioned cylindrical slide member rigidly secured to said cylinder head, said slide member being provided with diagonal slots extending in the vertical direction, a pin member rigidly secured in said guide means and extending through said slots with one of said stationary telescopic elements abutting thereagainst upwardly, said slots being of a length corresponding to the stroke of said one lever for the adjustment of said one valve, a further adjustable cylindrical slide member including the pivot means of said other lever, guide means for said further cylindrical slide member rigidly secured to said cylinder head, a cup-shaped member rigidly secured in said cylinder head with the open edge lying outside said cylinder head, the other of said stationary telescopic elements engaging said cup-shaped member and including a shoulder abutting against said edge, while the other movable telescopic element abuts with the free end thereof against the inner surface of said further slide member.

4. The combination according to claim 3, wherein said slots have a diameter substantially equal to that of said pin member, whereby said pin member fits snugly into said slots thereby preventing rotation of said first-mentioned cylindrical slide member about the longitudinal center axis thereof and of the lever connected therewith out of the plane of pivotal movement thereof.

5. The combination according to claim 3, wherein one end of the pivot means associated with said other lever includes a lip member, and wherein said second-mentioned guide means includes two finger members surrounding said lip member to prevent rotation of said further cylindrical slide member about the longitudinal center axis thereof and of the lever connected therewith out of the plane of pivotal movement thereof.

6. In a valve actuating mechanism for multi-cylinder combustion engines with a cylinder head in which each cylinder is provided with at least two valves having valve shafts, the combinations with a valve-lash adjusting mechanism for each valve comprising a stationary telescopic element and a movable telescopic element forming a chamber therebetween adapted to receive a fluid, a jacket formed of elastic material sealed with one end thereof to one of the telescopic elements and with the other end thereof to the other telescopic element, guide means rigidly secured to said cylinder head, means for holding each of the stationary telescopic elements stationary with respect to said guide means, a lever arm for each of said valves, means for pivotally connecting each lever with a respective movable telescopic element of a corresponding adjusting mechanism, said last-named means including a slide member surrounding said telescopic elements and slidable in said guide means, a cam shaft with individual cams for each of said valve shafts, one of said levers being actuated by one of said cams at the free end thereof and including means intermediate said free end and the pivotally connected end for actuating one of said valve shafts, the other lever including means located at the free end thereof for actuating the other valve shaft and being actuated by the other cam at a point intermediate said free end and pivotally connected end, the jacket of each adjusting mechanism together with the respective telescopic elements forming a space containing a source of liquid, means for connecting said source of liquid with said chamber including return check valve means to prevent the flow of the liquid from said chamber to said space, respective telescopic elements of each adjusting mechanism being so dimensioned as to provide sufficient play therebetween to provide a leakage path for said liquid from said chamber to said space, the telescopic elements of one of said mechanisms being connected with a corresponding guide means, a corresponding slide member and the corresponding lever to provide adjustment thereof in the upper direction, and the telescopic elements of the other adjusting mechanism being connected with the corresponding guide means, a corresponding slide member and a corresponding lever to provide adjustment in the downward direction.

References Cited in the file of this patent

UNITED STATES PATENTS

| 1,937,932 | Woolman | Dec. 5, 1933 |

FOREIGN PATENTS

| 289,468 | Great Britain | July 22, 1929 |
| 436,744 | Great Britain | Oct. 17, 1935 |